United States Patent Office 3,417,133
Patented Dec. 17, 1968

3,417,133
OXIDATION OF ETHYLENE OR PROPYLENE WITH A GROUP VIII NOBLE METAL COMPOUND, OXYGEN AND AN AMINE CARBOXYLATE
Brian Walton Harris, Carshalton, Surrey, England, assignor to The Distillers Company Limited, Edinburgh, Scotland, a British company
No Drawing. Filed Oct. 30, 1964, Ser. No. 407,883
Claims priority, application Great Britain, Nov. 9, 1963, 44,308/63
9 Claims. (Cl. 260—497)

The present invention relates to the production of organic esters of unsaturated alcohols by the oxidation of olefines.

Processes for the production of organic esters of unsaturated alcohols by the oxidation of olefines with molecular oxygen and/or an active oxidizing agent in solution in a carboxylic acid containing carboxylate ions, a platinum group metal salt as catalyst and a redox system are known. In such processes the carboxylate ions may be provided by the addition of alkali metal, or alkaline earth metal carboxylates. In such processes it is also known to simultaneously reoxidize the catalyst, reduced during the reaction, with molecular oxygen fed to the reaction in admixture with the olefine. Processes for the production of organic esters of unsaturated alcohols similar to that described above but carried out in the absence of the redox system and in which the catalyst is a platinum group metal itself in solid form deposited on a support material are also known. In these processes also simultaneous regeneration of the catalyst may be carried out by feeding molecular oxygen to the reaction in admixture with the olefine.

According to the present invention a process for the production of esters of unsaturated alcohols comprises reacting an olefine and a molecular oxygen containing gas with a solution containing an amine carboxylate, a carboxylic acid and a platinum group metal compound in the absence of a redox system.

The olefine employed in the process of the present invention may be any lower olefine such as propylene or ethylene. The use of ethylene is preferred.

The molecular oxygen may be supplied in the form of pure oxygen or in the form of a molecular oxygen containing gas, e.g. air.

The amine carboxylate suitably corresponds to the organic carboxylic acid in solution in which the reaction takes place. The carboxylate is preferably an acetate, in which case the product is an acetate ester. The amine carboxylate may be added to the reaction mixture as a ready formed compound or preferably is formed in situ by addition of a free amine to the acidic reaction mixture. The amine employed suitably has a dissociation constant pK of 5 or less and may be a mono-, di- or polyamine of the aliphatic, cycloaliphatic, substituted aromatic, arylalkyl or heterocyclic series. Primary and secondary amines may be used but tertiary amines are preferred. Examples of suitable amines are diethylamine, triethylamine, diisopropylamine, ethylene diamine, cyclohexylamine, benzylamine, piperidine and substituted piperidines, alkylpyrrolidines and piperazines.

The organic carboxylic acid is suitably glacial acetic acid, but other carboxylic acides may also be used.

By the term "platinum group metal" herein is meant any of the metals platinum, palladium, rhodium, ruthenium, osmium or iridium. The platinum group metal compound may be for example a palladium salt e.g. palladous chloride, or acetate and may be employed in catalytic quantities, e.g. 0.1 to 5 parts per 100 parts of solution by weight.

The process may be carried out at subatmospheric, atmospheric or superatmospheric pressure. A suitable range of pressures is for example 2 to 100 atmospheres absolute.

The process is suitably carried out at elevated temperatures e.g. 30° to 200° C. preferably 50° to 150° C.

The process of the present invention may be carried out by passing the olefine and molecular oxygen separately or in admixture through a heated solution containing a platinum group metal compound, amine carboxylate, and carboxylic acid.

In a preferred embodiment the process may be carried out in a continuous manner by continuously feeding olefine, molecular oxygen and carboxylic acid to the reactor, and continuously recovering the ester from the reactor.

Residual unreacted olefine and molecular oxygen may be recovered and recycled together with makeup of fresh feed. The ester product may be recovered by several methods depending upon its volatility. Thus, for example, the ester may be recovered by condensation from the residual olefine/oxygen stream leaving the reactor. Alternatively the ester may be recovered by distillation of a liquid bleed from the reactor, the residue being recycled to the reactor after removal of the ester. Water is formed in the reactor (theoretically 1 mole per mole of ester), and this may be substantially removed from the reaction zone (e.g. by dehydrating the liquid recycle stream) to avoid buildup. Some water can be tolerated bu the higher the concentration of water the greater the amount of acetaldehyde formed as by-product.

The process of the present invention is particularly suitable for the production of vinyl acetate from ethylene, and provides advantageous results over processes employed hitherto using alkali metal, or alkaline earth metal carboxylates.

The process of the present invention is described in more detail with reference to the following examples.

Example 1

A solution of palladous chloride, 2.0 parts by weight, and triethylamine, 14.6 parts in glacial acetic acid, 210 parts was sealed in a stainless steel autoclave of total capacity 750 ml. Equal amounts of ethylene and air were introduced to give an initial pressure (at 18° C.) of 70 atmospheres and the autoclave was then heated to 72° C. for 1 hour.

After cooling the excess gas was released and on analysis by mass spectrometry was found to contain carbon dioxide 0.2% by volume, oxygen 9.0%, nitrogen 52.0%, ethylene 38.7% and methane 0.2%. The acetic acid solution was analyzed by gas phase chromatography and was found to contain vinyl acetate 2.38% by weight, and acetaldehyde 0.29%.

Example 2

Using the same reactants as in Example 1 an experiment of 3 hrs. duration at 72° C. gave an acetic acid solution containing vinyl acetate 5.22% by weight, and acetaldehyde 0.28%. The residual gas contained ethylene 35.5% by volume, oxygen 6.9%, nitrogen 57.0% and carbon dioxide 0.1%.

Example 3

When an experiment was performed as in Example 2 using potassium acetate 19.6 parts in place of triethylamine the acetic acid solution contained vinyl acetate 1.80% and acetaldehyde 0.1%. The residual gas contained carbon dioxide 0.1%.

Example 4

When an experiment was preformed as in Example 2 using sodium acetate 16.8 parts in place of triethylamine the acetic acid solution contained vinyl acetate 1.72% and acetaldehyde 0.23%. The residual gas contained carbon dioxide 0.2%.

Example 5

A solution of palladium chloride (1.78 parts) and triethylamine (14.1 parts) in acetic acid (2.04 parts) was pressurized to 80 atmospheres in a stainless steel autoclave with a gas mixture comprising ethylene (93.6% by volume) and oxygen (6.4% by volume). After shaking for 1 hour at 50–53° C. the acetic acid solution contained 11.9% by weight of vinyl acetate and 2.0% by weight of acetaldehyde. The production rate of vinyl acetate was 1.36 moles/liter of reaction solution/hour and of acetaldehyde 0.47 moles/liter of reaction solution/hour.

I claim:

1. In the process for the production of esters of unsaturated alcohols which comprises reacting ethylene or propylene with an oxidizing agent in a medium comprising and organic carboxylic acid and the carboxylate ion of said acid, and a catalyst which is a compound of a metal of the platinum group, the improvement which comprises reacting said ethylene or propylene with oxygen or air, in a reaction zone in the absence of a redox system, with a salt of said organic carboxylic acid and an amine which is a member of the group consisting of diethylamine, triethylamine, diisopropylamine, ethylene diamine, cyclohexylamine, benzylamine and piperidine, at a temperature of between 30° C. and 200° C. and at a pressure of 2 to 100 atmospheres recovering said ester, substantially removing the water formed and recycling the unreacted ethylene or propylene into said reaction zone.

2. The process according to claim 1 which is conducted by continuously feeding said ethylene or propylene, said oxygen or air and said carboxylic acid into a reaction zone, and continuously removing said ester therefrom.

3. A process according to claim 1, wherein the carboxylic acid is acetic acid, and the carboxylate ion is the acetate ion.

4. A process according to claim 1, wherein the temperature is from 50° C. to 150° C.

5. A process according to claim 3, wherein the amine carboxylate is formed in situ by adding the amine to acetic acid as the carboxylic acid.

6. A process according to claim 1, wherein the compound of said platinum group metal is a palladous salt which is employed in the amount of 0.1 to 5 parts by weight per 100 parts by weight of solution.

7. A process according to claim 1, wherein the palladous salt is palladous chloride or palladous acetate.

8. A process for the production of vinyl acetate which comprises reacting ethylene and air in a solution of palladous chloride and triethylamine in acetic acid in the absence of a redox system at a temperature of from 50° C. to 150° C. and at a pressure of from 2 to 100 atmospheres absolute, and recoving the vinyl acetate produced.

9. A process according to claim 8, wherein the palladous salt is employed in the amount of 0.1 to 5 parts by weight per 100 parts by weight of solution.

References Cited

UNITED STATES PATENTS 3,221,045  11/1965  McKeon et al. _____ 260—497

FOREIGN PATENTS 614,970  9/1962  Belgium.
615,596  9/1962  Belgium.

LORRAINE A. WEINBERGER, *Primary Examiner.*

VIVIAN GARNER, *Assistant Examiner.*

U.S. Cl. X.R.

260—604